United States Patent
Cayer et al.

(10) Patent No.: US 12,500,965 B2
(45) Date of Patent: Dec. 16, 2025

(54) AUTHENTICATED CHANNEL FOR ENCRYPTION MANAGEMENT

(71) Applicant: Ciena Corporation, Hanover, MD (US)

(72) Inventors: Yves Cayer, Ottawa (CA); Zenon Slodki, Ottawa (CA)

(73) Assignee: Ciena Corporation, Hanover, MD (US)

( * ) Notice: Subject to any disclaimer, the term of this patent is extended or adjusted under 35 U.S.C. 154(b) by 290 days.

(21) Appl. No.: 18/469,391

(22) Filed: Sep. 18, 2023

(65) Prior Publication Data
US 2025/0097327 A1    Mar. 20, 2025

(51) Int. Cl.
*H04L 69/40* (2022.01)
*H04L 9/40* (2022.01)
*H04L 41/0654* (2022.01)

(52) U.S. Cl.
CPC .......... *H04L 69/40* (2013.01); *H04L 41/0654* (2013.01); *H04L 63/0428* (2013.01); *H04L 63/08* (2013.01)

(58) Field of Classification Search
CPC . H04L 9/12; H04L 69/40; H04L 63/08; G06F 11/16; G06F 11/2005
See application file for complete search history.

(56) References Cited

U.S. PATENT DOCUMENTS

| | | | |
|---|---|---|---|
| 8,818,897 B1 | 8/2014 | Slodki et al. | |
| 9,768,870 B2 | 9/2017 | Miedema et al. | |
| 2009/0007153 A1* | 1/2009 | Mysore | G06F 9/545 719/321 |
| 2019/0116127 A1* | 4/2019 | Pismenny | H04L 63/0272 |
| 2021/0234901 A1* | 7/2021 | Thomas | H04L 63/1408 |
| 2023/0177146 A1* | 6/2023 | Dastidar | G06F 21/6209 726/22 |
| 2025/0030667 A1* | 1/2025 | Cayer | H04L 9/0852 |

FOREIGN PATENT DOCUMENTS

WO    WO-2022051189 A1 *    3/2022    ........... H04L 9/3239

* cited by examiner

*Primary Examiner* — Douglas B Blair
(74) *Attorney, Agent, or Firm* — Baratta Law PLLC; Lawrence A. Baratta, Jr.

(57) ABSTRACT

This disclosure provides systems, methods and apparatuses for managing encryption in a network. A local modem is managed by a local control processor (CP) via a local authenticated channel. The local authenticated channel is established between the local modem and a first CP (as the local CP) using runtime authentication material. When the first CP is removed or becomes inoperative, the local modem detects an authentication failure associated with the local authenticated channel. The local modem can communicate an alarm message via a trusted channel to a remote modem. In response to the alarm message, the local modem can receive a reauthentication command via the trusted channel. The reauthentication command is configured to cause the local modem to establish a new local authenticated channel with a second CP (such as a new local CP to replace the first CP).

16 Claims, 8 Drawing Sheets

AUTHENTICATED CHANNEL FOR ENCRYPTION MANAGEMENT

TECHNICAL FIELD

This disclosure relates generally to network communication and some aspects relate to maintaining an authenticated channel for managing encryption in a network.

DESCRIPTION OF RELATED TECHNOLOGY

In a communication system, two or more network devices can communicate encrypted data via a transport network (such as an optical transport network (OTN) or wide area network). The links of the transport network might include cables or wireless signals (including links that traverse public networks, shared networks, wireless networks, or point-to-point network connections) that connect the network devices with one another. The network devices can implement security protocols to protect data communicated via a link. Each network device can have one or more modems that serve as endpoints of respective links. Two modems (sometimes referred to as encryption modems) can establish an encrypted traffic channel over a link. The modems use data path encryption to encrypt and decrypt data communicated via the encrypted traffic channel. The modems can also establish a trusted channel over the link to communicate encryption settings (such as keys, cipher settings, and the like). The trusted channel is used for key agreement or other encryption settings so that a receiver of encrypted data can properly decrypt the encrypted traffic channel. The trusted channel can also be used to coordinate a security association between the encryption modems.

In some implementations, encryption modems are managed by control processors (CPs). A CP can initialize and manage cryptographic functions of a modem. Where two modems serve as respective endpoints of a link, the modems can be managed by a different respective CPs. For example, the first modem and a first CP at one endpoint of a link can be referred to as a local modem and local CP, respectively. The second modem and a second CP at another endpoint of a link can be referred to as a remote modem and a remote CP, respectively. Each CP provides encryption parameters that the corresponding modem uses to secure the trusted channel, the encrypted traffic channel, or both. Examples of encryption parameters can include peer authentication material for establishing the trusted channel, cryptography key material for encryption or decryption of the encrypted traffic channel, and security policies, among other examples.

A CP provides encryption parameters to a corresponding modem via an authenticated channel between the CP and the modem. When the modem has an authenticated channel with a CP, the modem is said to be in a managed state. Conversely, when the modem does not have an authenticated channel with a CP, the modem is said to be in an unmanaged state. The authenticated channel can become unavailable when the CP is removed, damaged, blocked or otherwise inaccessible. If a modem remains in an unmanaged state, the modem may be unable to perform some cryptographic functions associated with data path encryption.

BRIEF SUMMARY

The systems, methods, and apparatuses of this disclosure each have several innovative aspects, no single one of which is solely responsible for the desirable attributes disclosed herein.

One aspect of this disclosure can be implemented as a local modem. The local modem includes a management interface, a link interface, and a modem processor. The link interface is configured to communicatively couple the local modem to a remote modem. The modem processor is configured to establish a local authenticated channel with a first control processor (CP) via the management interface. The modem processor is configured to manage a trusted channel between the local modem and the remote modem via the link interface based on encryption parameters received from the first CP. The modem processor is configured to detect that the first CP has become unavailable and communicate an alarm message via the trusted channel based on the first CP becoming unavailable. The modem processor is configured to receive a reauthentication command via the trusted channel. The modem processor is configured to reestablish the local authenticated channel with a second CP via the management interface based on the reauthentication command.

Another aspect of this disclosure can be implemented as a method of a local modem. The method includes establishing a local authenticated channel with a first control processor (CP) via a management interface of the local modem and managing a trusted channel over a link interface communicatively coupling the local modem to a remote modem based on encryption parameters received from the first CP. The method includes detecting that the first CP has become unavailable and communicating an alarm message via the trusted channel based on the first CP becoming unavailable. The method includes receiving a reauthentication command via the trusted channel. The method includes reestablishing the local authenticated channel with a second CP via the management interface based on the reauthentication command.

Another aspect of this disclosure can be implemented in a CP. The CP includes a management interface having a local authenticated channel to a local modem. The control also includes a processor configured to provide encryption parameters to the local modem via the local authenticated channel to enable the local modem to manage a trusted channel between the local modem and a remote modem. The CP is configured to receive an alarm message from the local modem via the local authenticated channel, where the alarm message indicates that the remote modem is in an unmanaged state due to failure of a remote authenticated channel between the remote modem and a first remote CP. The CP is configured to communicate a reauthentication command to the remote modem via the local authenticated channel, the local modem, and the trusted channel. The reauthentication command is configured to cause the remote modem to reestablish the remote authenticated channel with a second remote CP.

Details of one or more implementations of the subject matter described in this disclosure are set forth in the accompanying drawings and the description below. Other features, aspects, and advantages will become apparent from the description, the drawings, and the claims.

BRIEF DESCRIPTION OF THE SEVERAL VIEWS OF THE DRAWINGS

Like reference numbers and designations in the various drawings indicate like elements. Note that the relative dimensions of the figures may not be drawn to scale.

DETAILED DESCRIPTION

The following description is directed to certain implementations for the purpose of describing innovative aspects of this disclosure. However, a person having ordinary skill in the art will readily recognize that the teachings herein can be applied in a multitude of different ways. The described implementations can be implemented in any means, apparatus, system, or method for network communication.

Two network devices communicate via a link. A first network device (which may be referred to as a local network device) includes a local modem at one endpoint of the link. A second network device (which may be referred to as a remote network device) includes a remote modem at another endpoint of the link. The local modem and the remote modem can communicate encrypted data via an encrypted traffic channel over the link. To manage the encrypted traffic channel, the local modem and the remote modem can also establish a trusted channel over the link. In addition to the trusted channel, each modem can have an authenticated channel to a corresponding control processor (CP). Each CP provides encryption parameters (such as peer authentication material for the trusted channel, key material associated with the encrypted traffic channel, or security policies, among other examples) to its corresponding modem. This disclosure distinguishes the various modems, authentication channels and CPs by referring to a local system and a remote system. The designation of "local" and "remote" is for clarity of the description. Using this nomenclature, a local modem has a local authenticated channel with a local CP, and a remote modem has a remote authenticated channel with a remote CP.

A local authenticated channel between a local CP and a local modem is secured by authentication material. In some implementations, local CP and the local modem initially authenticate each other using default authentication material (such as pre-programmed certificates). After the initial authentication, the local CP and the local modem can share runtime authentication material (which may include runtime certificates). The runtime authentication material can be specific to the local CP or can be unique for the local authenticated channel between them. After sharing runtime authentication material, the local CP and the local modem use the runtime authentication material to establish and maintain the local authenticated channel.

Occasionally, a local CP might be removed or replaced, such as due to servicing or "hot-swapping" the CP associated with the local system. When a new CP is introduced, the local modem may not have runtime authentication material for the new CP. Therefore, the local modem may be unable to authenticate the new CP and the local authenticated channel may no longer be available. When a local modem does not have a local authentication channel to a CP, the local modem is said to be in an unmanaged state. In the unmanaged state, the local modem may continue to maintain the trusted channel with the remote modem for a period of time. However, if the local modem remains in the unmanaged state beyond the period of time, the local modem may be unable to continue encrypted communication with the remote modem.

This disclosure provides systems, methods and apparatuses for managing encryption in a network. The disclosed techniques enable a local modem to manage a local authenticated channel between the local modem and a local CP. The local CP is configured to manage encryption parameters of the local modem for encryption of data between the local modem and a remote modem. The local authenticated channel is initially established between the local modem and a first CP (as the local CP). When the first CP becomes unavailable, the local modem detects an authentication failure due to the runtime authentication material for the first CP no longer being effective. As a result, the local authenticated channel becomes unavailable and the local modem enters an unmanaged state. The local modem can communicate an alarm message via a trusted channel to the remote modem. In response to the alarm message, the local modem can receive a reauthentication command via the trusted channel. The reauthentication command is configured to cause the local modem to authenticate a second CP and establish a new local authenticated channel with the second CP. For example, the second CP may be a new local CP to replace the first CP.

In some aspects, the reauthentication command can include runtime authentication material associated with the second CP such that the local modem can identify and authenticate the second CP. The local modem can use the runtime authentication material from the reauthentication command to establish the new local authenticated channel with the second CP. The runtime authentication material for the second CP may be configured by a user at the remote system or may be securely obtained from a network management server.

In some aspects, the reauthentication command may not explicitly identify the second CP or may not include the runtime authentication material for the second CP. In such instances, the reauthentication command may trigger the local modem to authenticate the second CP using default authentication material. After the local modem authenticates the second CP using the default authentication material, the local modem and the second CP can share runtime authentication material and establish the new local authenticated channel.

In some aspects, the sequence of operations including the alarm message, the reauthentication command, and the authentication of the second CP can collectively be referred to as a reauthentication protocol. The reauthentication protocol might include other operations. For example, the reauthentication protocol may include communication between the remote modem and a remote CP in relation to the reauthentication command. The reauthentication protocol can include operations by the local modem to determine whether the reauthentication command is valid or to determine when to disregard the reauthentication command based on one or more conditions. For example, the local modem may disregard the reauthentication command if the local modem already has established a new local authenticated channel with another CP or if the reauthentication command is received after a time limit following the alarm message.

Particular implementations of the subject matter described in this disclosure can be implemented to realize one or more of the following potential advantages. The disclosed techniques can enable a first CP to be replaced (also referred to as being "hot-swapped") by a second CP with little or no disruption to the encryption functions of the first modem. Thus, a user can perform field servicing of a CP while a modem remains active. The reauthentication protocol can reduce complexity and time associated with managing authenticated channels between modems and their respective CPs. Furthermore, the disclosed techniques include protections against identity replacement attacks or other security breaches that might otherwise occur during a reauthentication procedure.

Figure 1:
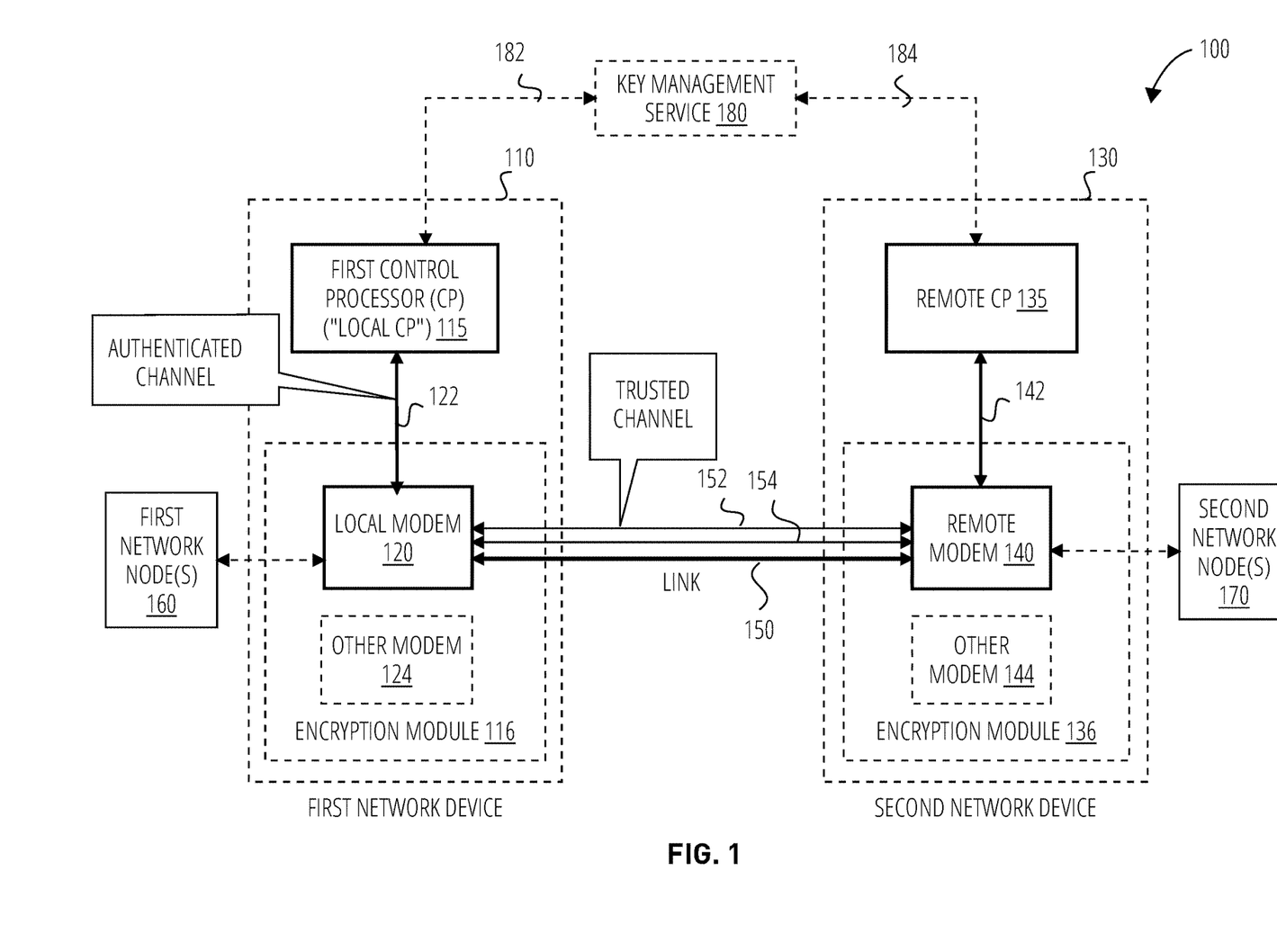
FIG. 1 illustrates an example communication system.
Figure 2:
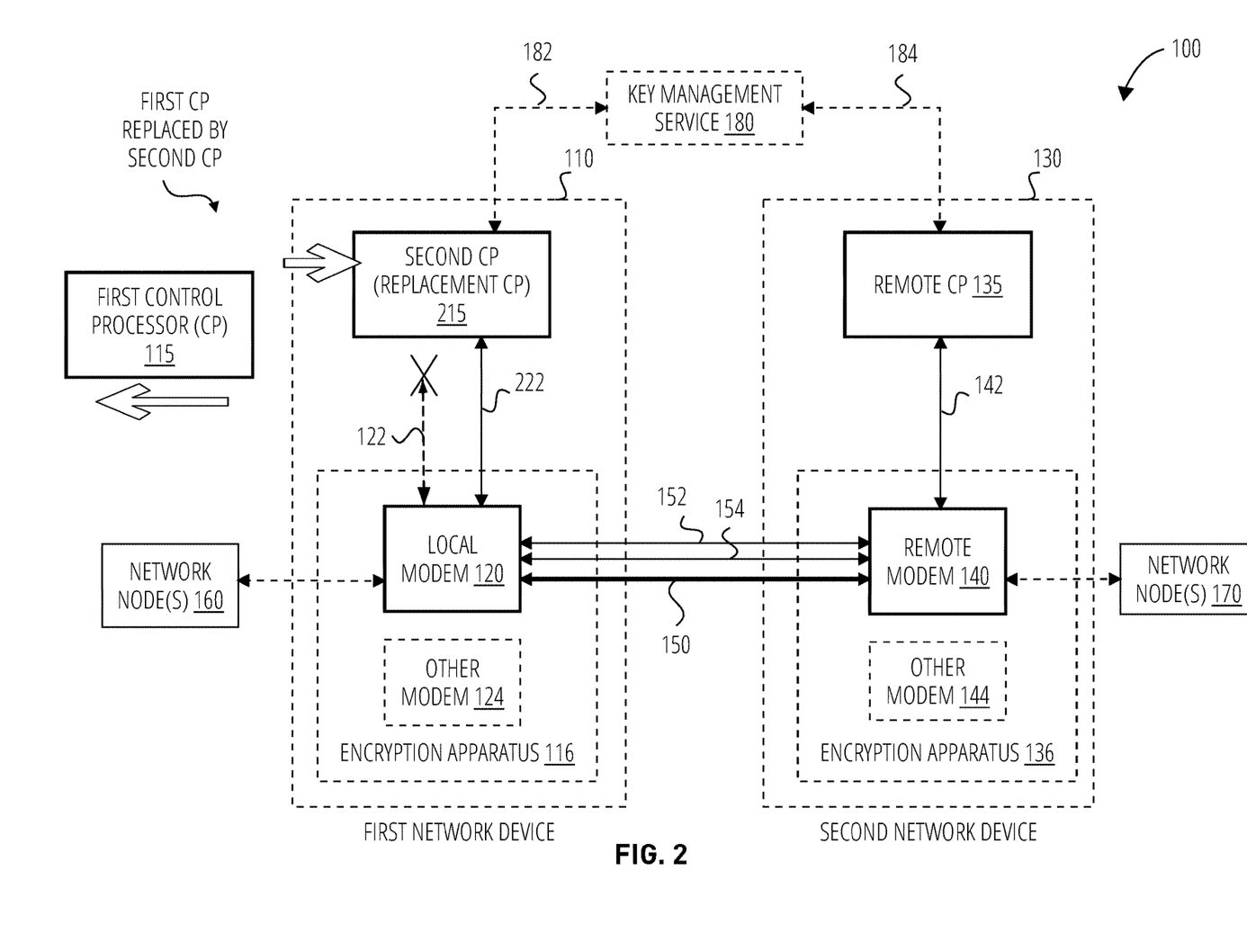
FIG. 2 illustrates an example use case in which a control processor (CP) is replaced.

FIG. 1 illustrates an example communication system 100. The communication system 100 includes a first network device 110 and a second network device 130. The first network device 110 includes a modem (labeled as local modem 120) configured to communicate with the second network device 130. The second network device 130 includes a modem (labeled as remote modem 140). The local modem 120 and the remote modem 140 are endpoints of a link 150 between the first network device 110 and the second network device 130. The link 150 may be a fiber optic connection between the local modem 120 and the remote modem 140. The local modem 120 and the remote modem 140 are managed by CPs. FIG. 1 shows a first CP 115 (acting as a local CP) configured to manage the local modem 120. FIG. 2 also shows a remote CP 135 configured to manage the remote modem 140. In some implementations, the CPs 115 and 135 are collocated or integrated into the network devices 110 and 130, as shown in FIG. 1. For example, the CPs can be modules of the network devices. In some other implementations, the one or both of the CPs may be external components that are communicatively coupled to the network devices. In FIG. 1, the first CP 115 and the local modem 120 may be referred to as a local system, and the remote CP 135 and the remote modem 140 may be referred to as a remote system.

In some implementations, the first network device 110 may include an encryption module 116. The encryption module 116 may include the local modem 120 and one or more other modems 124. Similarly, the second network device 130 may include an encryption module 136 that includes the remote modem 140 and one or more other modems 144. In some examples, the network devices 110 and 130 may be rack mounted hardware platforms. The rack mounted hardware platforms may include a chassis in which the encryption modules 116 and 136 can be placed and communicatively coupled. Similarly, the CPs 115 and 135 may be hot-swappable components within the network devices 110 and 130.

In some communication systems, a key management service 180 can distribute cryptographic keys, authentication material, security policies, or other configurations to the first CP 115 and the remote CP 135. In addition to, or in lieu of, the key management service 180, the communication system might include a network management server (not shown) configured to coordinate security policies of the first CP 115 and the remote CP 135. The key management service 180 (or network management server) can communicate security parameters to the first CP 115 via a first northbound interface 182 and can communicate security parameters to the remote CP 135 via a second northbound interface 184. The term "northbound interface" refers to a relationship in which the key management service 180 has a higher level management authority over the CPs 115 and 135 compared to the level of management between the CPs 115 and 135 and their corresponding modems 120 and 140.

FIG. 1 shows some aspects of the local system for descriptive purposes. The local modem 120 has an authenticated channel (referred to as a local authenticated channel 122) with the first CP 115. The local authenticated channel 122 can also be referred to as a cryptography management channel or a north-south (N/S) channel. The local authenticated channel 122 may be established over an untrusted network, such as a local network internally located within the first network device 110. In some implementations, the local authenticated channel 122 is established using Transport Layer Security (TLS) 1.3 protocols. TLS includes authentication as well as encryption of information between devices. Alternatively, or additionally, the local modem 120 and the first CP 115 could use other security protocols that include authentication. Authentication refers to a security process to verify that a device is who it claims to be. Authorization refers to a security process to determine level of access. Authentication and authorization are closely related and sometimes referred to collectively as "authentication" in a security protocol if authorization is assumed for properly authenticated devices. Some security protocols (such as TLS) can include procedures for both authentication and encryption. Network security, including continual authentication of network channels, enables protection against intrusion, eavesdropping, and circumvention.

As described previously, the local authenticated channel 122 may be authenticated by authentication material. In some implementations, the local modem 120 initially authenticates the first CP 115 using default authentication material. The default authentication material can also be referred to as an initial device identification ("iDevID"). In some implementations, the default authentication material may be a pre-determined global certificate shared by one or more manufactures of CPs that are compatible with the local modem 120. The local modem 120 can use a trust on first use (TOFU) mechanism to select a CP. In FIG. 1, the local modem 120 detects that the first CP 115 is present in the local system based on an initial authentication of the default authentication material. After the initial authentication, the first CP 115 and the local modem 120 establish mutual authentication material referred to as runtime authentication material. The runtime authentication material can be referred to as a logical device identification ("LDevID"). Additionally, or alternatively, the runtime authentication material can be referred to as a CP identification (CPID). The runtime authentication material may include device identification certificates. For example, the local modem 120 can store a device identification certificate of the first CP 115 and the first CP 115 can store a device identification certificate of the local modem 120. The runtime authentication material of the first CP 115 may be referred to as a first CP identification (CPID1).

The first CP 115 and the local modem 120 store the runtime authentication material in volatile memory and use the runtime authentication material to maintain authentication of the local authenticated channel 122. Once the local modem 120 establishes the local authenticated channel 122 with the first CP 115, the local modem 120 latches to the runtime authentication material of the first CP 115 to mitigate the potential security risk of another CP attempting to manage the local modem 120.

The first CP 115 provides encryption parameters to the local modem 120 via the local authenticated channel 122. The local modem 120 uses the encryption parameters to establish a trusted channel 152 with the remote modem 140 via the link 150. The trusted channel can also be referred to as a peer encryption management channel or an east-west (E/W) channel because it coordinates security policies between peer modems having the same or similar security level. The local modem 120 also establishes an encrypted traffic channel 154 over the link 150. The trusted channel 152 is used for key agreement between the local modem 120 and the remote modem 140 for encryption and decryption of traffic in the encrypted traffic channel 154. In some implementations, the trusted channel 152 and the encrypted traffic channel 154 can be established using the TLS 1.3 protocol. Once the trusted channel 152 and the encrypted traffic channel 154 are established, the local modem 120 can encrypt and communicate traffic from first network node(s) 160 to remote modem 140. Thus, traffic originating from first network node(s) 160 and destined for second network node(s) 170 can be encrypted and communicated via the encrypted traffic channel 154. Similarly, the local modem 120 can receive encrypted traffic destined for the first network node(s) 160 via the encrypted traffic channel 154.

Having described the local system (including operations of the local modem 120, the local authenticated channel 122 and the first CP 115), it should be understood that the remote system performs similar operations. The remote modem 140 has a remote authenticated channel 142 with the remote CP 135 that is authenticated using runtime authentication material that is specific to the remote CP 135 and the remote modem 140. The remote modem 140 is a peer endpoint of the trusted channel 152 and the encrypted traffic channel 154 with the local modem 120.

FIG. 2 illustrates an example use case in which a CP is replaced. Occasionally, a CP may require maintenance or replacement. In the example of FIG. 2, the first CP 115 may be removed from the first network device 110 for servicing. The first CP 115 may be replaced by a second CP 215. When the first CP 115 is removed or offline, the local authenticated channel 122 becomes unavailable and the local modem 120 enters an unmanaged state. Because the local modem 120 is latched to the runtime authentication material (CPID1) of the first CP 115, the local modem 120 will not automatically reauthenticate with the second CP 215.

The local modem 120 can continue to communicate with the remote modem 140 via the trusted channel 152 in the unmanaged state. However, after a period of time in the unmanaged state, the encryption parameters may become stale and the absence of the local authenticated channel 122 can cause a disruption in the encrypted traffic channel 154. One technique to cause the local modem 120 to reestablish a local authenticated channel 222 with the second CP 215 is to power cycle the local modem 120. Power cycling the local modem 120 causes it to detect a second CP 215 based on the TOFU mechanism using the default authentication material. Power cycling the local modem 120 causes a disruption in the encrypted traffic channel 154. Therefore, some aspects of this disclosure describe a reauthentication protocol that enables the local modem 120 to reestablish a local authenticated channel 222 with the second CP 215 without disrupting the encrypted traffic channel 154.

In accordance with aspects of this disclosure, when the local modem 120 detects that the local authenticated channel 122 is unavailable (or when the local modem 120 detects that it has entered an unmanaged state), the local modem 120 communicates an alarm message to the remote modem 140.

In various examples, the alarm message can indicate a loss of communication with the first CP 115, a failure to authenticate the first CP 115 via the local authenticated channel 122, an indication that the first CP 115 has been replaced by the second CP 215, or a status indicating that the local modem 120 is in the unmanaged state.

The remote modem 140 can relay the alarm message to the remote CP 135. The remote CP 135 can communicate a reauthentication command to the local modem 120 (via the remote modem 140 and the trusted channel 152) to cause the local modem 120 to reestablish the local authenticated channel 222 with the second CP 215. Before communicating the reauthentication command, the remote CP 135 may obtain a verification from a higher level authority (such as from a user or a network management server). In some implementations, when the remote CP 135 receives the alarm message, the remote CP 135 communicates an error message to the user or the network management server to indicate that the remote CP 135. Alternatively, the remote CP 135 can cause an error message to appear on a user interface (not shown). In response to the error message, the remote CP 135 may receive an instruction from the user, network management server, or user interface, where the instruction causes the remote CP 135 to communicate the reauthentication command to the local modem 120. In some implementations, the remote CP 135 may obtain runtime authentication material of the second CP 215 from a user or network management server and include the runtime authentication material of the second CP 215 in the reauthentication command.

In some implementations, the reauthentication command is configured to cause the local modem 120 to detect any available CP using the TOFU mechanism and the default authentication material. For example, the reauthentication command may not explicitly indicate or identify the second CP 215. Rather, the reauthentication command may trigger the local modem 120 to discover the second CP 215. After discovering the second CP 215, the local modem 120 reestablishes the local authenticated channel 222 with the second CP 215.

In some other implementations, the reauthentication command is configured to cause the local modem 120 to reauthenticate the second CP 215. The second CP 215 may be identified or otherwise indicated in the reauthentication command. For example, the reauthentication command can include runtime authentication material associated with the second CP 215. The runtime authentication material of the second CP 215 may be referred to as a second CP identification (CPID2). The local modem 120 may use the CPID2 to authenticate the second CP 215 and maintain the local authenticated channel 222 with the second CP 215.

After receiving the reauthentication command, the local modem 120 authenticates the second CP 215 and reestablishes the local authenticated channel (shown as local authenticated channel 222) with the second CP 215. In some implementations, the local modem 120 can determine whether to follow or disregard the reauthentication command based on one or more conditions, such as those described with reference to FIG. 7. For example, if the local modem 120 already has established a new local authenticated channel with another CP, the local modem 120 may disregard the reauthentication command. Alternatively, or additionally, if the local modem 120 receives the reauthentication command after a time limit following communication of the alarm message, the local modem 120 may disregard the reauthentication command.

Figure 3:
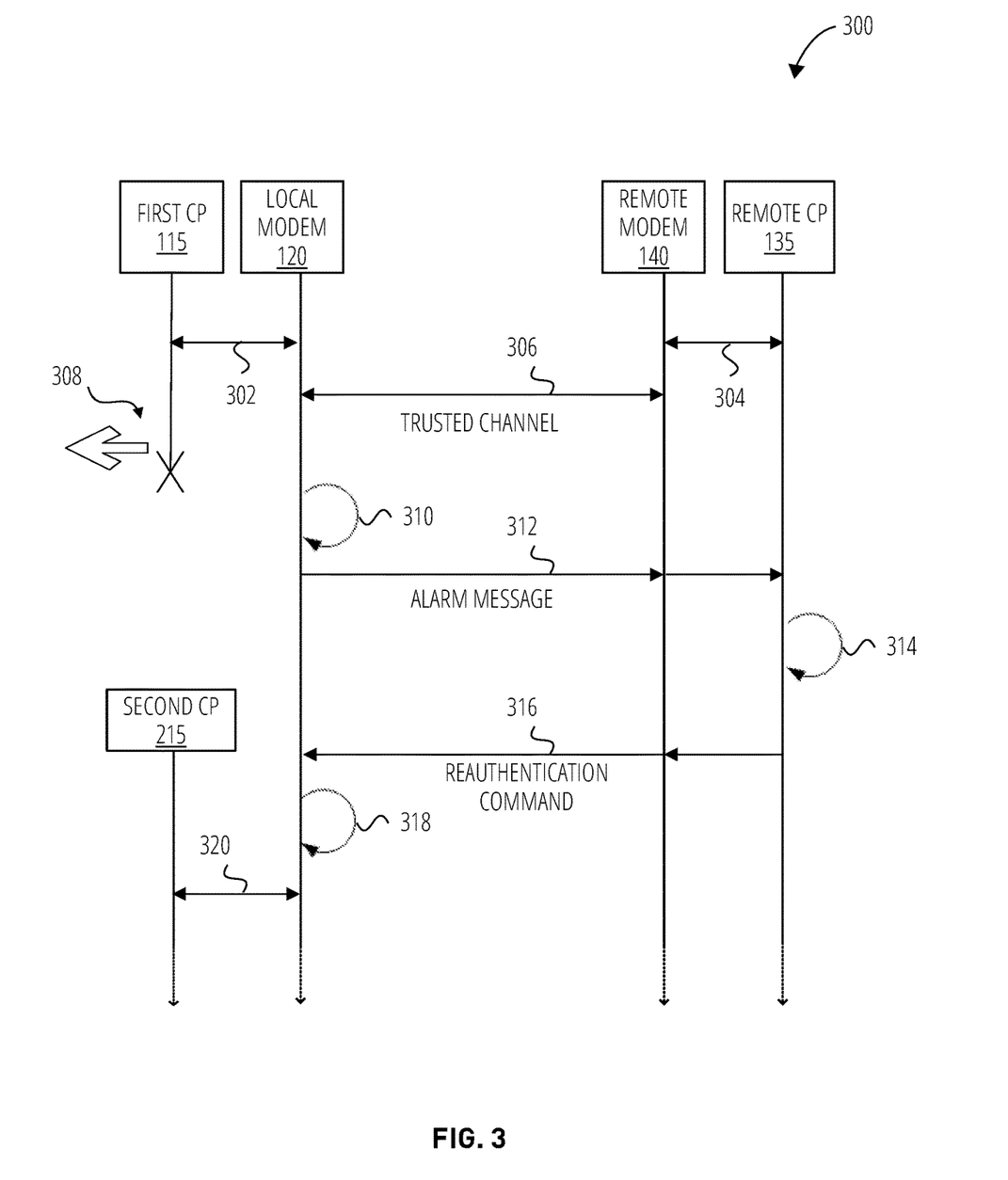
FIG. 3 illustrates a message flow diagram in accordance with some aspects of this disclosure.

FIG. 3 illustrates a message flow diagram 300 in accordance with some aspects of this disclosure. The message flow diagram 300 shows operations and messages of the local modem 120, the remote modem 140 and remote CP 135. At the beginning of the message flow diagram 300, the local modem 120 and the first CP 115 have established a local authenticated channel 302. Similarly, the remote modem 140 and the remote CP 135 have established a remote authenticated channel 304. The local modem 120 receives encryption parameters from the first CP 115 via the local authenticated channel 302. The remote modem 140 receives encryption parameters from the remote CP 135 via the remote authenticated channel 304. Using the encryption parameters, the local modem 120 and the remote modem 140 establish a trusted channel 306.

At some time (shown as event 308), the first CP 115 is removed or becomes offline. The local modem 120 detects 310 that the local authenticated channel 302 is no longer available based on a failure to communicate with the first CP 115. The local modem 120 communicates an alarm message 312 to the remote modem 140, which provides the alarm message 312 to the remote CP 135. At process 314, the remote CP 135 determines to generate a reauthentication command 316 based on user input or verification from a network management server. The remote CP 135 communicates the reauthentication command 316 to the remote modem 140, which relays the reauthentication command 316 to the local modem 120 via the trusted channel 306. After receiving the reauthentication command 316 via the trusted channel 306, the local modem 120 performs a reauthentication 318 to establish a local authenticated channel 320 with the second CP 215.

Figure 4:
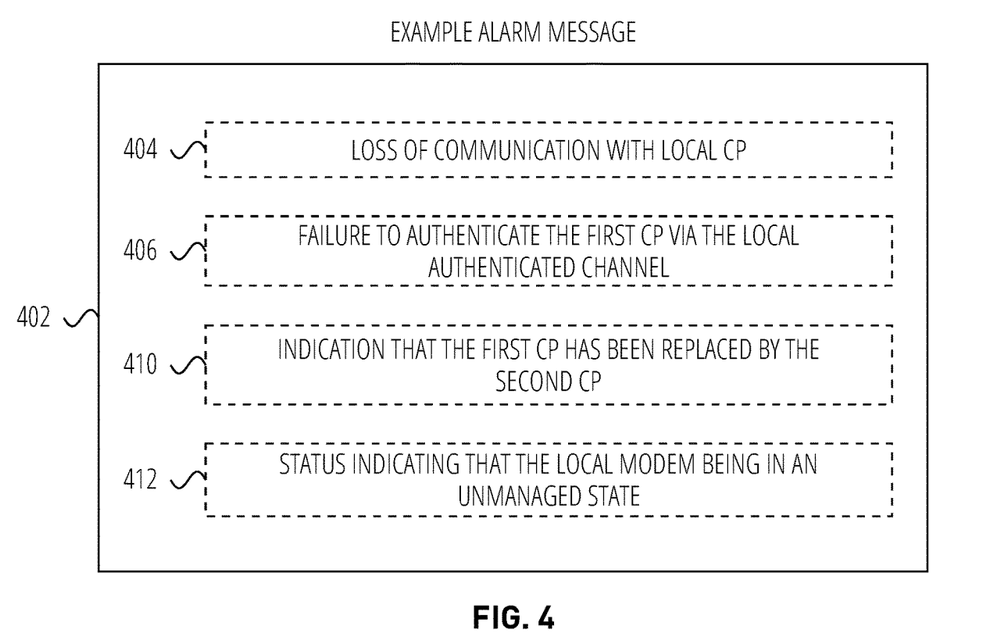
FIG. 4 illustrates an example alarm message according to some implementations of this disclosure.

FIG. 4 illustrates an example alarm message 402 according to some implementations of this disclosure. The alarm message 402 may be communicated from a local modem (such as the local modem 120 described with reference to FIG. 2 and FIG. 3) via a trusted channel (such as the trusted channel 306 described with reference to FIG. 3) to a remote modem (such as the remote modem 140 described with reference to FIG. 2 and FIG. 3). The alarm message 402 might include one or more fields, information elements, or indicators. For example, the alarm message 402 might indicate a loss of communication with local CP 404, a failure to authenticate the first CP via the local authenticated channel 406, an indication that the first CP has been replaced by the second CP 410, a status indicating that the local modem being in an unmanaged state 412, or any combination thereof.

Figure 5:
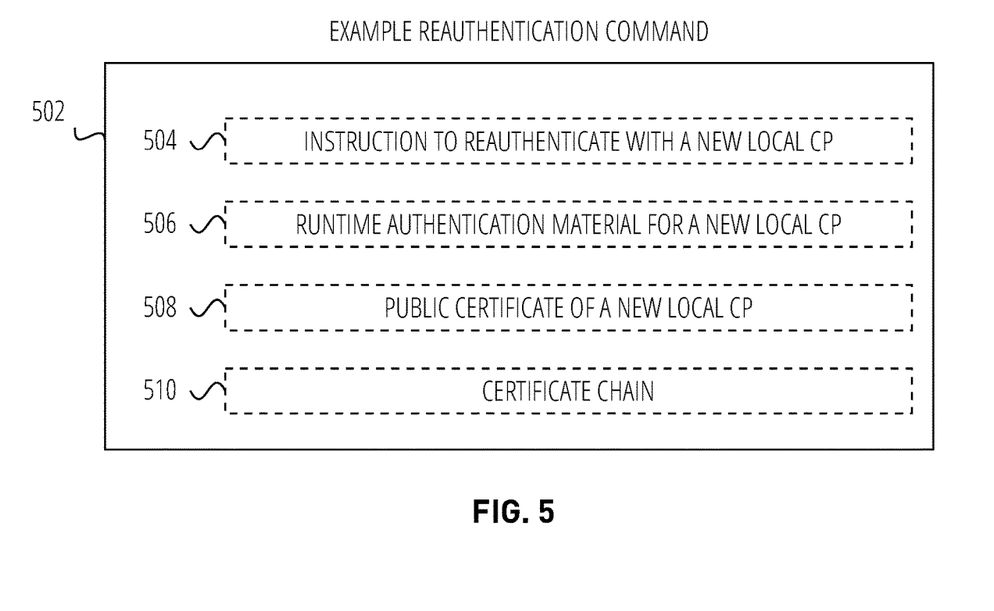
FIG. 5 illustrates an example reauthentication command according to some implementations of this disclosure.

FIG. 5 illustrates an example reauthentication command 502 according to some implementations of this disclosure. The reauthentication command 502 may be communicated from a remote modem (such as the remote modem 140 described with reference to FIG. 2 and FIG. 3) via a trusted channel (such as the trusted channel 306 described with reference to FIG. 3) to a local modem (such as the local modem 120 described with reference to FIG. 2 and FIG. 3). The reauthentication command 502 might include one or more fields, information elements, or indicators. For example, the reauthentication command 502 might include an instruction to reauthenticate with a new local CP 504 (such as the second CP 215 described with reference to FIG. 2 and FIG. 3), runtime authentication material 506 for the new local CP, a public certificate 508 of the new local CP, a certificate chain 510 associated with the new local CP, or any combination thereof.

Figure 6:
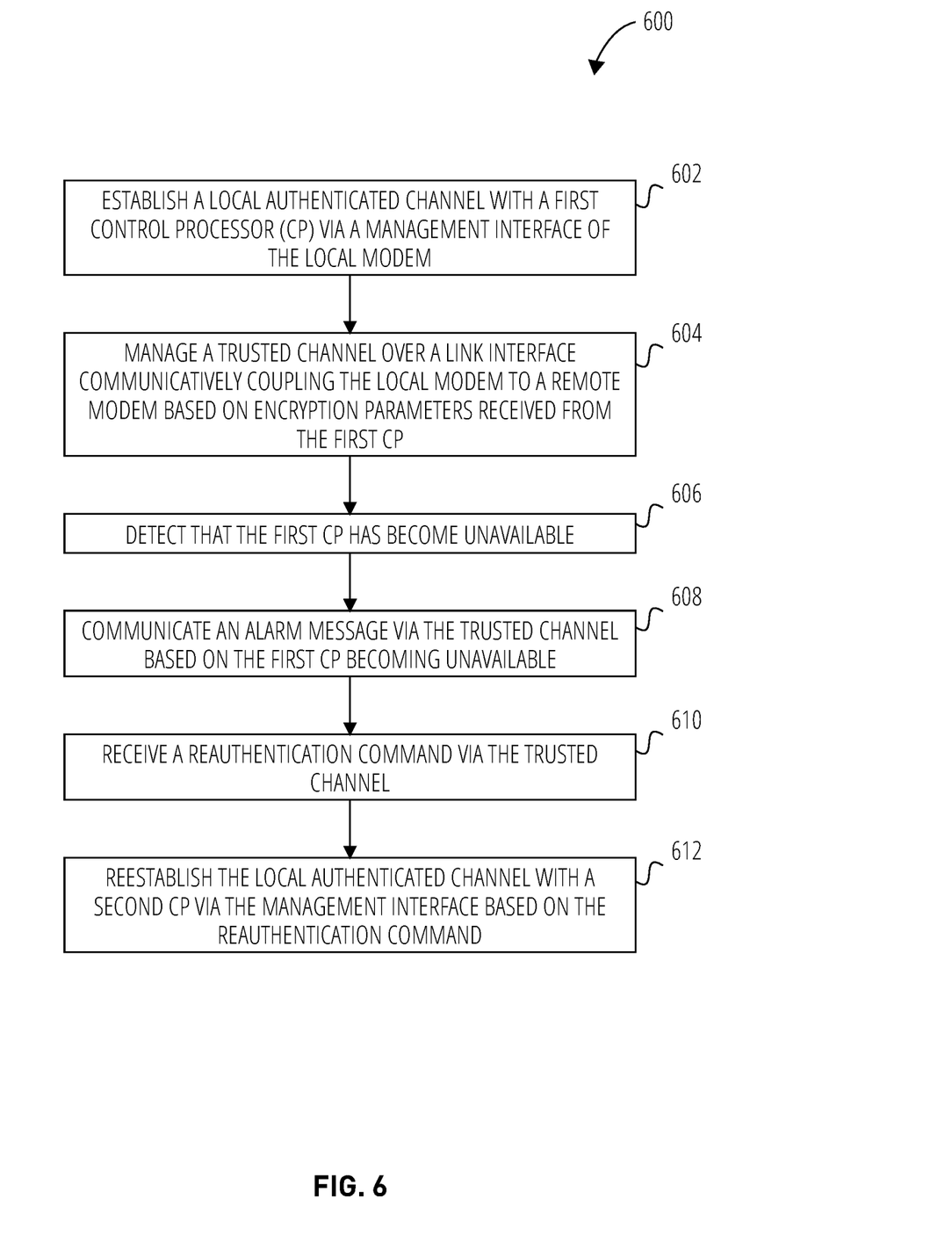
FIG. 6 illustrates example operations of a modem according to some implementations of this disclosure.

FIG. 6 illustrates example operations 600 of a modem according to some implementations of this disclosure. The example operations 600 might be performed by a local modem (such as the local modem 120 described with reference to FIG. 2 and FIG. 3). In block 602, the local modem establishes a local authenticated channel with a first CP via a management interface of the local modem. In block 604, the local modem manages a trusted channel over a link interface communicatively coupling the local modem to a remote modem based on encryption parameters received from the first CP. In block 606, the local modem detects that the first CP has become unavailable. In block 608, the local modem communicates an alarm message via the trusted channel based on the first CP becoming unavailable. In block 610, the local modem receives a reauthentication command via the trusted channel. In block 612, the local modem reestablishes the local authenticated channel with a second CP via the management interface based on the reauthentication command.

Figure 7:
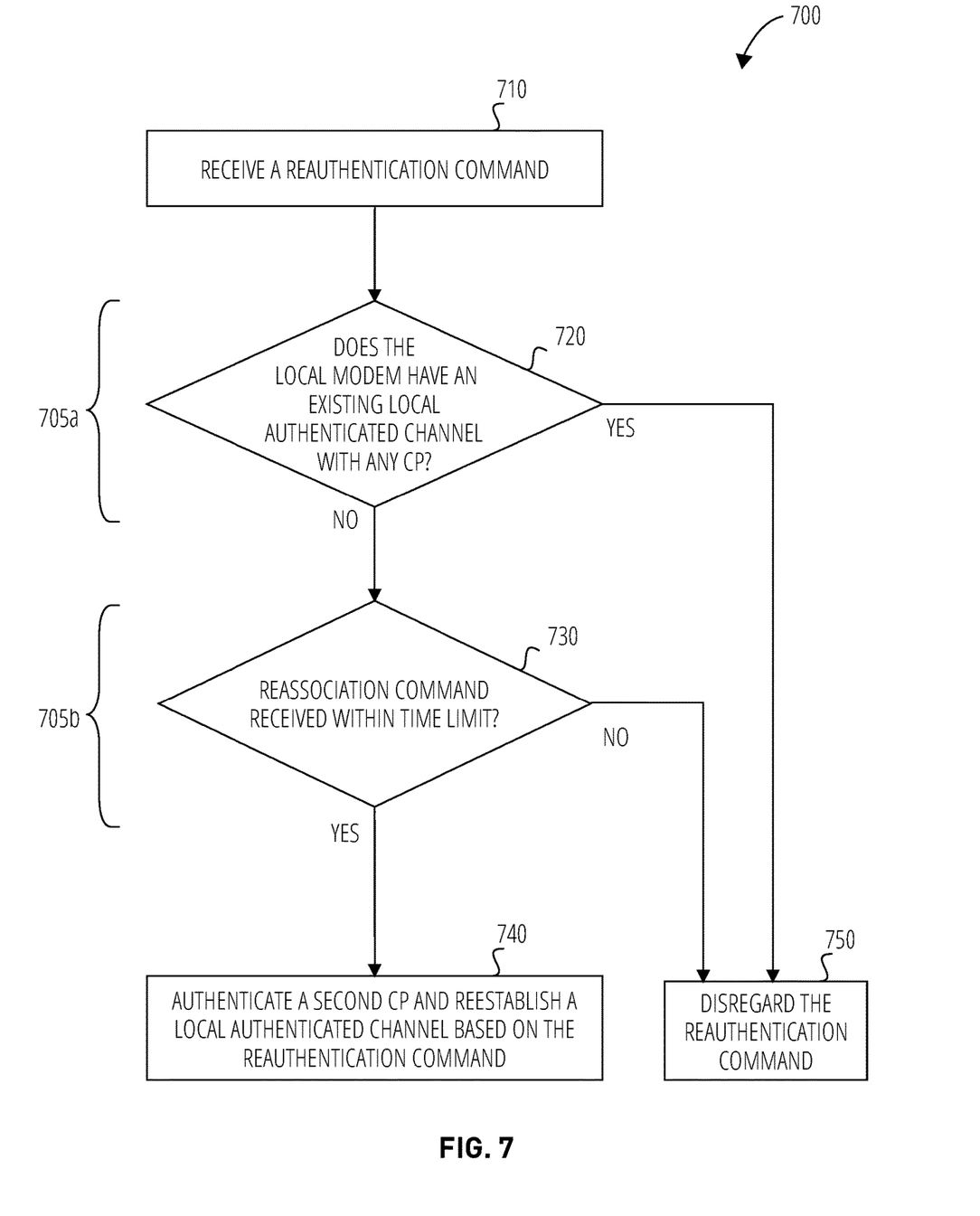
FIG. 7 illustrates example operations to increase security of a reauthentication protocol according to some implementations of this disclosure.

FIG. 7 illustrates example operations 700 to increase security of a reauthentication protocol according to some implementations of this disclosure. The example operations 700 might be performed by a local modem (such as the local modem 120 described with reference to FIG. 2 and FIG. 3). At block 710, the local modem receives a reauthentication command via a trusted channel. The local modem may determine whether to process the reauthentication command or disregard the reauthentication command based on one or more conditions (shown as a first example condition 705a and a second example condition 705b in FIG. 7). While both the first example condition 705a and second example condition 705b are shown together in FIG. 7, it should be understood that a local modem can use one condition (either of the example conditions 705a and 705b). Furthermore, the local modem can use the example conditions 705a and 705b in a different order than illustrated in FIG. 7.

In the first example condition 705a, at block 720, the local modem determines whether it has an existing local authenticated channel with any other CP. For example, the local modem may have already reauthenticated with another CP before receiving the reauthentication command. This condition also prevents the local modem from acting on the reauthentication command when the local modem is already in a managed state and is latched to an existing CP of the local system. A potential technical advantage of the first example condition 705a is that the local modem can mitigate against an identity replacement attack in which an attacker injects a spoofed reauthentication command into the trusted channel in attempt to breach the security of the local system. In block 720, if the local modem already has an existing local authenticated channel, the local modem proceeds to block 750 where the local modem disregards the reauthentication command. Alternatively, if the local modem does not already have an existing local authenticated channel, the local modem may proceed to another condition (such as the second example condition 705b) or to block 740 where the local modem processes the reauthentication command.

In the second example condition 705b, at block 730, the local modem determines whether the reassociation command was received within a time limit following communication of an alarm message. A potential technical advantage of the second example condition 705b is that the local modem can mitigate the risk of prolonged exposure to an identity replacement attack during the reauthentication protocol. In block 730, if the reauthentication command is received after the time limit, the local modem proceeds to block 750 where the local modem disregards the reauthentication command. Alternatively, if the reauthentication command is received before expiration of the time limit, the local modem may proceed to another condition (not shown) or to block 740 where the local modem processes the reauthentication command.

Although the time limit described with reference to block 730 is based on the duration between communication of the alarm message and reception of a reauthentication command, other time limits can be implemented to limit prolonged exposure. For example, in implementations where the local modem decides to process the reauthentication command in block 740, the local modem may implement a time limit regarding how long the local modem will attempt to authenticate a new CP, as described in the following paragraph.

At block 740, the local modem authenticates with a second CP and reestablishes the local authenticated channel with the second CP based on the reauthentication command. In some implementations, the operations of block 740 are initiated by the second CP. For example, the second CP may initiate establishment of the local authenticated channel using runtime authentication material of the second CP by initiating a TLS handshake. When the runtime authentication material presented in the TLS handshake matches runtime authentication material obtained from the reauthentication command and the TLS handshake occurs within a time period following the reauthentication command, the local modem completes the TLS handshake to establish the local authenticated channel with the second CP.

Alternatively, the reauthentication command may not include runtime authentication material for any CP but instead instructs the local modem to authenticate with the next CP that initiates a TLS handshake using default authentication material. If the TLS handshake is initiated by the second CP within the time period following the reauthentication command, the local modem may complete the TLS handshake and obtain the runtime authentication material of the second CP directly from the second CP. Once the second modem has obtained the runtime authentication material, the second modem can use the runtime authentication material to establish the local authenticated channel.

At block 750, if any of the conditions (such as the example conditions 705a and 705b) are met, the local modem disregards the reauthentication command.

Figure 8:
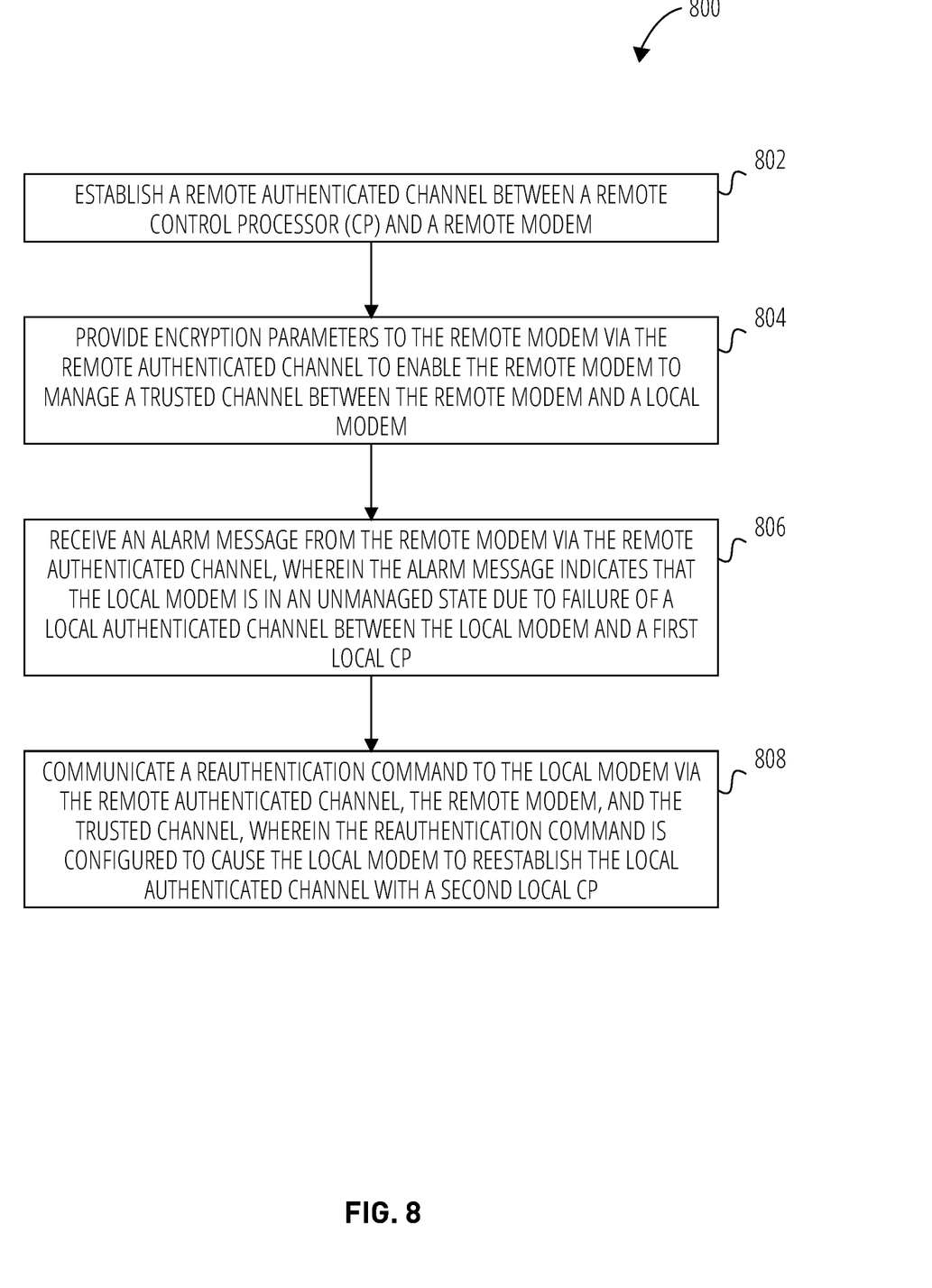
FIG. 8 illustrates example operations of a control processor according to some implementations of this disclosure.

FIG. 8 illustrates example operations 800 of a control processor according to some implementations of this disclosure. The example operations 800 might be performed by a remote CP (such as the remote CP 135 described with reference to FIG. 2 and FIG. 3). At block 802, the remote CP establishes a remote authenticated channel between the remote CP and a remote modem. At block 804, the remote CP provides encryption parameters to the remote modem via the remote authenticated channel to enable the remote modem to manage a trusted channel between the remote modem and a local modem. At block 806, the remote CP receives an alarm message from the remote modem via the remote authenticated channel. The alarm message indicates that the local modem is in an unmanaged state due to failure of a local authenticated channel between the local modem and a first local CP. At block 808, the remote CP communicates a reauthentication command to the local modem via the remote authenticated channel, the remote modem, and the trusted channel. The reauthentication command is configured to cause the local modem to reestablish the local authenticated channel with a second local CP.

Although the example operations 600, 700, and 800 described with reference to FIG. 6, FIG. 7, and FIG. 8, respectively, depict a particular sequence of operations, the sequence may be altered without departing from the scope of the present disclosure. For example, some of the operations depicted may be performed in parallel or in a different sequence that does not materially affect the function of the operations. In other examples, different components of an example device or system that implements the operations may perform functions at substantially the same time or in a specific sequence.

Figure 9A:
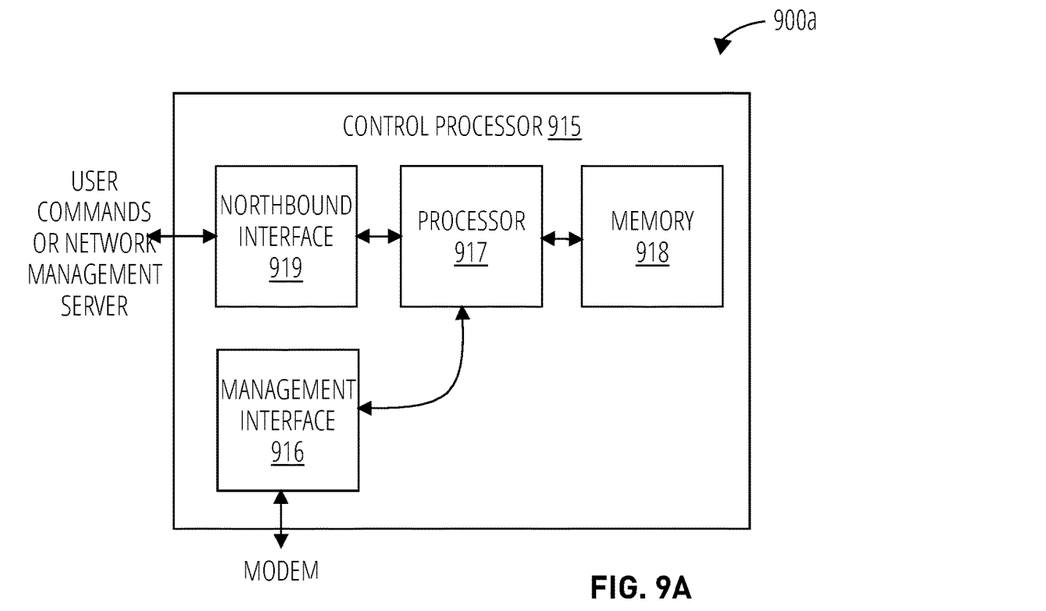
FIG. 9A illustrates a block diagram of an example control processor according to some implementations of this disclosure.

FIG. 9A illustrates a block diagram 900a of an example CP 915 according to some implementations of this disclosure. The CP 915 may be an example of any of the control processors described herein, such as the first CP 115, the remote CP 135, or the second CP 215 described with reference to FIG. 1, FIG. 2, and FIG. 3. The CP 915 may be capable of performing any of the operations described with reference to the first CP 115, the remote CP 135, or the second CP 215, or any of the example operations 800 described with reference to FIG. 8.

The CP 915 includes a management interface 916, a processor 917, a memory 918, and a northbound interface 919. The management interface 916 is configured to communicate with a modem and serves as an endpoint of an authenticated channel. The processor 917 can communicate encryption parameters to the modem via the management interface 916 and the authenticated channel. In some aspects, the memory 918 stores the encryption parameters. Additionally, or alternatively, the memory 918 stores runtime authentication material for the modem. The processor 917 can manage the management interface 916 to establish the authenticated channel using the runtime authentication material obtained from the memory 918. The northbound interface 919 can communicate with a key management service or a network management server. Alternatively, or additionally, the northbound interface 919 can provide a communication interface for user commands.

Figure 9B:
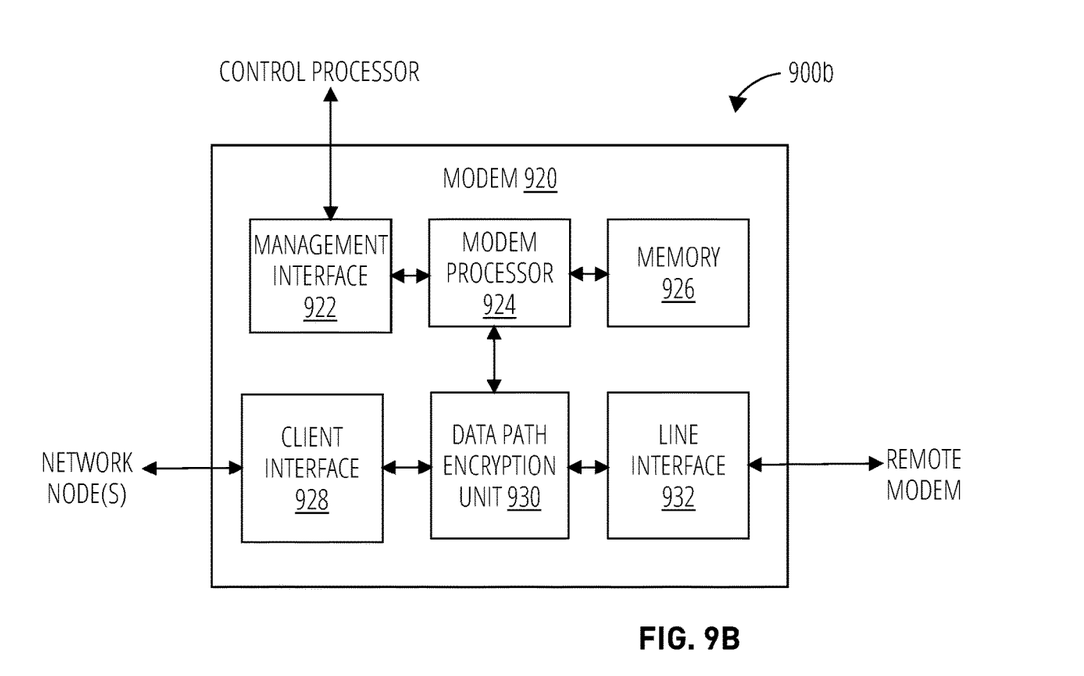
FIG. 9B illustrates a block diagram of an example modem according to some implementations of this disclosure.

FIG. 9B illustrates a block diagram 900b of an example modem 920 according to some implementations of this disclosure. The modem 920 may be an example of any of the modems described herein, such as the local modem 120 or the remote modem 140 described with reference to FIG. 1, FIG. 2, and FIG. 3. The modem 920 may be capable of performing any of the operations described with reference to the local modem 120 or the remote modem 140, or any of the example operations 600 and 700 described with reference to FIG. 6 and FIG. 8, respectively.

The modem 920 includes a management interface 922, a modem processor 924, a memory 926, a client interface 928, a data path encryption unit 930, and a line interface 932. The management interface 922 is configured to communicate with a CP and serves as an endpoint of an authenticated channel. The modem processor 924 can receive encryption parameters from the CP via the management interface 922 and the authenticated channel. In some aspects, the memory 926 stores the encryption parameters. Additionally, or alternatively, the memory 926 stores runtime authentication material for the CP. The modem processor 924 can manage the management interface 922 to establish the authenticated channel using the runtime authentication material obtained from the memory 926. In accordance with aspects of this disclosure the modem processor 924 can reestablish a local authenticated channel with a new CP based on a reauthentication command received from a remote modem or remote CP.

The modem processor 924 also manages cryptography functions of the data path encryption unit 930 based on encryption parameters received from the CP. The data path encryption unit 930 encrypts traffic received from network nodes via the client interface 928 and communicates the encrypted traffic via the line interface 932 to a remote modem. The line interface 932 can serve as an endpoint of a link to the remote modem. The line interface 932 is configured to establish a trusted channel and an encrypted traffic channel over the link. In some implementations, the client interface 928 is a wired network interface, such as any of the communication technologies described in Institute of Electrical and Electronics Engineers (IEEE) 802.3 family of standards. In some implementations, the line interface 932 is an optical interface. The data path encryption unit 930 may include an encryption processor for line speed encryption of traffic from the client interface 928 to the line interface 932 and line speed decryption of traffic from the line interface 932 to the client interface 928.

With reference to FIG. 9A and FIG. 9B, various implementations of processors, interfaces, and memory are possible. Either, or both, the processor 917 or the modem processor 924 may include multiple processors, multiple cores or multiple nodes. The processor 917 or the modem processor 924 may implement multi-tasking and multi-threading, among other examples. The processor 917 or the modem processor 924 can be any custom made or commercially available processor, a central processing unit (CPU), general purpose processor (GPP), multicore processor, an auxiliary processor among several processors, a semiconductor-based microprocessor (in the form of a microchip or chipset), or generally any device for executing software instructions. The memory (such as memory 918 and/or memory 926) may be system memory or any one or more of the possible realizations of computer-readable media described herein. The memory can include any of volatile memory elements (e.g., random access memory (RAM, such as DRAM, SRAM, SDRAM, etc.)), nonvolatile memory elements (e.g., ROM, hard drive, flash drive, solid state drive (SSD), CDROM, etc.), and combinations thereof. Moreover, the memory may incorporate electronic, magnetic, optical, and/or other types of storage media.

The interfaces (such as management interface 916, the northbound interface 919, the management interface 922, the client interface 928, the line interface 932) and the memory (such as memory 918 or memory 926) may be communicatively coupled to one another and to the processor (such as processor 917 or 924), for example, by a bus (not shown). The bus can be any type of bus, including buses such as PCI, ISA, PCI-Express, HyperTransport®, Infini-Band®, NuBus®, AHB, AXI, etc. In some implementations, the interfaces may be distributed within the processor and the memory. The memory may include computer instructions executable by the processor to implement the functionality of the implementations described herein. Any one of these functionalities may be partially, or entirely, implemented in hardware or on the processor. For example, the functionality may be implemented with an application specific integrated circuit, in logic implemented in the processor, in a co-processor on a peripheral device or card, among other examples. Further, realizations may include fewer or additional components not illustrated in FIG. 9A and FIG. 9B.

FIG. 1 through FIG. 9B and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

The foregoing disclosure provides illustration and description but is not intended to be exhaustive or to limit the aspects to the precise form disclosed. Modifications and variations may be made in consideration of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the disclosed implementation options.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A local modem, comprising:
    a management interface;
    a link interface configured to communicatively couple the local modem to a remote modem; and
    a memory storing computer-executable instructions that, when executed by a modem processor, cause the modem processor to:
    establish a local authenticated channel with a first control processor (CP) via the management interface,
    manage a trusted channel between the local modem and the remote modem via the link interface based on encryption parameters received from the first CP,
    detect that the first CP has become unavailable,
    communicate an alarm message via the trusted channel based on the first CP becoming unavailable,
    receive a reauthentication command via the trusted channel, and
    reestablish the local authenticated channel with a second CP via the management interface based on the reauthentication command.

2. The local modem of claim 1, wherein the modem processor is configured to detect that the first CP has become unavailable based on at least one of:
    a communication failure between the modem processor and the first CP,
    a failure to authenticate the first CP, or
    a detection that the first CP has been removed from a local network associated with the management interface.

3. The local modem of claim 1, wherein the modem processor is configured to execute the instructions stored in the memory to:
    reestablish the local authenticated channel with the second CP based on the reauthentication command when the management interface does not have the local authenticated channel established with any CP.

4. The local modem of claim 3, wherein the modem processor is configured to execute the instructions stored in the memory to disregard the reauthentication command when the management interface does have the local authenticated channel established with another CP other than the second CP.

5. The local modem of claim 1, wherein the modem processor is configured to execute the instructions stored in the memory to:
    establish the local authenticated channel with the second CP if the reauthentication command is received within a time limit after communicating the alarm message, and
    disregard the reauthentication command if the reauthentication command is received after the time limit.

6. The local modem of claim 1, wherein the modem processor being is configured to execute the instructions stored in the memory to:
    establish the local authenticated channel with the first CP using first runtime authentication material associated with the first CP,
    obtain, from the reauthentication command, second runtime authentication material associated with the second CP, and
    reestablish the local authenticated channel with the second CP using the second runtime authentication material.

7. The local modem of claim 1, wherein the alarm message indicates at least one of:
    a loss of communication with the first CP,
    a failure to authenticate the first CP via the local authenticated channel,
    the first CP being replaced by the second CP, or
    a status indicating that the local modem being in an unmanaged state due to a failure of the local authentication channel.

8. The local modem of claim 1, wherein the remote modem has a remote authenticated channel with a remote CP, and wherein the reauthentication command is received from the remote CP via the remote modem.

9. A method of a local modem, comprising:
    establishing a local authenticated channel with a first control processor (CP) via a management interface of the local modem;
    managing a trusted channel over a link interface communicatively coupling the local modem to a remote modem based on encryption parameters received from the first CP;
    detecting that the first CP has become unavailable;
    communicating an alarm message via the trusted channel based on the first CP becoming unavailable;

receiving a reauthentication command via the trusted channel; and reestablishing the local authenticated channel with a second CP via the management interface based on the reauthentication command.

10. The method of claim 9, wherein detecting that the first CP has become unavailable includes at least one of:

detecting a communication failure between a modem processor of the local modem and the first CP, detecting a failure to authenticate the first CP, or detecting that the first CP has been removed from a local network associated with the management interface.

11. The method of claim 9, further comprising:

reestablishing the local authenticated channel with the second CP based on the reauthentication command when the management interface does not have the local authenticated channel established with any CP.

12. The method of claim 11, further comprising:

disregarding the reauthentication command when the management interface does have the local authenticated channel established with another CP other than the second CP.

13. The method of claim 9, further comprising:

establishing the local authenticated channel with the second CP if the reauthentication command is received within a time limit after communicating the alarm message, and disregarding the reauthentication command if the reauthentication command is received after the time limit.

14. The method of claim 9, further comprising:

establishing the local authenticated channel with the first CP using first runtime authentication material associated with the first CP;

obtaining, from the reauthentication command, second runtime authentication material associated with the second CP; and reestablishing the local authenticated channel with the second CP using the second runtime authentication material.

15. The method of claim 9, wherein the alarm message indicates at least one of:

a loss of communication with the first CP, a failure to authenticate the first CP via the local authenticated channel, the first CP being replaced by the second CP, or a status indicating that the local modem being in an unmanaged state due to a failure of the local authentication channel.

16. The method of claim 9, wherein the remote modem has a remote authenticated channel with a remote CP, and wherein the reauthentication command is received from the remote CP via the remote modem.

* * * * *